Patented June 23, 1942

2,287,455

UNITED STATES PATENT OFFICE 2,287,455

CORRECTED BASIC REFRACTORY

Gilbert E. Seil, Cynwyd, Pa., assignor to E. J. Lavino and Company, Philadelphia, Pa., a corporation of Delaware No Drawing. Application October 11, 1940, Serial No. 360,745

2 Claims. (Cl. 106—62)

This invention relates to corrected basic refractories and more particularly in the making thereof to the use of dolomitic starting material, thus rendering available low priced raw materials hitherto considered unsuited for this highly specialized field.

Magnesia bearing materials, such as dolomite, which contain, in addition to magnesia, appreciable amounts of lime, have found only a limited application as refractory materials, due to the difficulty of maintaining the lime in a stable condition either by dead burning or by chemical correction. Whenever free lime (CaO) is present in a refractory body there is a definite tendency toward hydration and disintegration in the presence of any moisture. In addition, free lime causes the body to be exceedingly basic. Free lime is a very reactive material and is used extensively in the refining of steel as a slag forming material. It reacts with nearly every slag used in metallurgical practice. Because of its tendency toward hydration, its great chemical reactivity and its extreme basicity, free and uncombined lime, (calcium oxide) is a very undesirable constituent of refractory bodies, despite its high melting point.

On investigation I find that refractory materials of improved characteristics can be made by the correction of the lime in dolomitic material by heat treating the material in intimate mixture with alumina ($Al_2O_3$) and silica ($SiO_2$), forming, in accordance with the amounts of alumina and silica used, calcium aluminate ($CaO.Al_2O_3$), calcium orthosilicate ($2.CaO.SiO_2$) and, if desired, monticellite ($CaO.MgO.SiO_2$), with the remainder of the magnesia as periclase in the heat treated product. It is one of the objects of this invention to convert raw materials containing magnesia and appreciable amounts of lime into stable refractory materials by the formation in the body of such stable compounds of calcium as calcium aluminate, calcium orthosilicate and optionally monticellite.

The raw materials used in the process may be dolomite as a source of lime and magnesia; corundum, bauxite or diaspore as sources of alumina; ganister, quartzite or tripoli as sources of silica; and aluminum silicate minerals, such as kyanite, andalusite or sillimanite, or clay as sources of both alumina and silica. When an intimate mixture of dolomite, and any alumina or alumina-silica yielding material is heated to a temperature below the fusion point of the mass, but above the critical temperature at which the conversions take place, products are obtained, the compositions of which vary with the relative proportions of magnesia, lime, alumina and silica, and the properties of which vary with the composition. Thus it becomes another object of this invention to predetermine the properties of the corrected refractory material by control of the amounts of alumina and silica added to the starting mixture, thereby controlling the amounts of calcium aluminate, calcium orthosilicate, monticellite and periclase in the finished product.

I have found by experiment that when a mixture containing magnesium oxide, calcium oxide, aluminum oxide, and silica, or a mixture containing the above oxides with silicates and/or aluminates, is finely ground and heated, the first critical point is reached at the temperature at which calcium aluminate is formed. The next compounds formed are calcium orthosilicate and, if there is residual silica, monticellite, leaving the magnesia in excess of the monticellite requirement present as magnesium oxide (periclase). If the same mixture is heated beyond the fusion point of the mass, the rate of cooling determines the type of crystals which are formed and the chemical unions which take place. The physical placement of the crystals and the glasses are only under partial control, whereas in this invention the raw materials are heated to and beyond the critical temperatures for the formation of calcium aluminate, calcium orthosilicate, monticellite and periclase, but well below the fusion point of the mass, and the crystals and grains retain their relative original positions. In other words, by the practice of this invention there is no appreciable migration of any component in the mixture, whereas in a molten mass individual constituents of the liquid are free to move in every direction and on cooling such a mass a material of non-uniform chemical composition and non-homogeneous physical structure is obtained. So another object of this invention is a corrected basic refractory, comprising uniform and controllable placement, in respect to each other, of the chemical entities formed. And still another object of this invention is the control of the chemical composition of the crystals formed by the heat treatment.

I have found it preferable to work with alumina additions in such amounts that the lime (CaO) is molecularly in excess of the $Al_2O_3$, so that after the formation of calcium aluminate which always forms first, in accordance with the process of this invention, there is left residual lime for conversion with silica to calcium orthosilicate, or if desired, for conversion with silica and magnesia to monticellite, depending upon the ratio of the residual lime to the silica present.

In no case do I use alumina and silica in such molecular deficiency with respect to the lime that free and uncombined lime (CaO) is found in the finished product. Nor do I use sufficient alumina and silica so that any silicates other than orthosilicates can be formed.

If the molecular percentage of the residual lime after the formation of calcium aluminate is twice the molecular percentage of silica in the mix, the silica is converted to calcium orthosilicate. If the residual lime is molecularly equal to the silica in the mix, they will unite with their molecular equivalent of magnesia to form monticellite. If the molecular percentage of lime is between these amounts, mixtures of calcium orthosilicate and monticellite are formed, in accordance with the following formula: In this formula the term "pounds of lime" and the symbol "#CaO" always refer to the residual lime after the formation of calcium aluminate, that is to the number of pounds of lime available for reaction with silica.

Let X=Number of pounds of $(CaO)_2.SiO_2$ which will be formed
and Y=Number of pounds of $CaO.MgO.SiO_2$ which will be formed
Since $(CaO)_2.SiO_2$ contains 65.12% CaO and 34.88% $SiO_2$, and
Since $CaO.MgO.SiO_2$ contains 35.84% CaO and 38.39% $SiO_2$
Then .6512X+.3584Y=#CaO
and .3488X+.3839Y=#$SiO_2$
(.6512)(.3488)X+(.3584)(.3488)Y=.3488(#CaO)
(.6512)(.3488)X+(.6512)(.3839)Y=.6512(#$SiO_2$)
.125Y−.250Y=.3488(#CaO)−.6512(#$SiO_2$)
.125Y=.6512(#$SiO_2$)−.3488(#CaO)
Y=5.2096(#$SiO_2$)−2.790(#CaO)

This formula may also be derived as follows:

Y=Number of pounds of monticellite formed $$= (2)(Mol. wt. CaO.MgO.SiO_2)\left[Mols\ SiO_2 - \frac{Mols\ of\ CaO}{2}\right]$$

$$= 2(156.45)\left[\frac{\#SiO_2}{60.06} - \frac{\#CaO}{2(56.08)}\right]$$

$$= 312.90\left[\frac{\#SiO_2}{60.06} - \frac{\#CaO}{112.16}\right]$$

$$= \frac{312.90(\#SiO_2)}{60.06} - \frac{312.90(\#CaO)}{112.16}$$

$$= 5.2096(\#SiO_2) - 2.790(\#CaO)$$

A third method for the derivation of this formula follows:

$SiO_2$ in $CaO.MgO.SiO_2$ $$= 2\left[\#SiO_2 - \#CaO\frac{Mol.Wt.SiO_2}{2(Mol.Wt.CaO)}\right]$$

$$= 2\left[\#SiO_2 - \#CaO\frac{60.06}{2(56.08)}\right]$$

$$= 2[\#SiO_2 - .5355\#CaO]$$

$$= 2\#SiO_2 - 1.0710\#CaO$$

Since $CaO.MgO.SiO_2$ contains 38.39% $SiO_2$

Y=Number of pounds of monticellite formed $$= \frac{(2\#SiO_2 - 1.071\#CaO)}{.3839}$$

$$= 5.2096(\#SiO_2) - 2.790(\#CaO)$$

Below are listed, with their melting points as given in the International Critical Tables, the three compounds which are controllably formed by the process of this invention:

Calcium aluminate—$CaO.Al_2O_3$—2912° F.
Calcium orthosilicate $2CaO.SiO_2$—3866° F.
Monticellite—$CaO.MgO.SiO_2$—2728° F.

while the melting point of periclase—MgO is over 5000° F.

In refractory bodies there are two components—the primary or refractory component and the secondary or bonding component. The primary or refractory component is preferably as a grog and comprises those compounds which will not soften or melt at temperatures to which the brick will be subjected in service. The secondary or bonding component comprises those compounds which will melt, or melt and react, at lower temperatures and which, because of their fusibility and reactivity, form a mass of crystals or of glass which binds the refractory component into a dense body. The secondary component should preferably be present in thin films which surround and bond the refractory grog, so that at no point is there a concentration of low melting point materials, and so that the melting of the relatively thin films during service does not seriously effect the refractoriness of the product. For the services to which the product of this invention are applicable, the refractory component must have a melting point of 3200° or higher. The secondary component must have a reaction and melting range of between 2300° F. and 3000° F. to permit the formation of dense bodies in commercially available firing equipment, or in service if the products are intended for installation in the unfired state. Therefore, for this invention, both periclase which melts above 5000° F., and calcium orthosilicate which melts at 3866° F., are refractory compounds, and together they form the primary component. The calcium aluminate and monticellite (if present) form the secondary component for it will be noted that both calcium aluminate and monticellite have relatively low melting points. For this reason their presence as major portions of the finished product is avoided if high melting points or softening points are desired in the final product. However, the presence of one or both of these compounds in the secondary component is advantageous in that they facilitate the formation of dense clinkers, permit of lower firing temperatures for the shaped refractories and are advantageous when the material is used in granular form for furnace bottoms, etc. In the practice of this invention, I prefer to form predetermined amounts of calcium aluminate as my bonding constituent, and small amounts, approximately 1% of monticellite. By causing the formation of a very small amount of monticellite, I do not introduce sufficient of this compound to deleteriously affect the finished product, but I have provided insurance against the presence of free lime in the product.

It is known that calcium orthosilicate exists in two forms, the alpha form, which is stable above 2588° F. and the beta form, which is stable below 2588° F., with a great difference in specific gravity and in specific volume between the two forms. I have found, however, that by the addition of a small percentage of phosphate to the mixture, the crystalline form, which is stable at high temperatures without the addition of the phosphate, becomes stable at low temperatures, and that the tendency of the lime toward hydration has become completely destroyed by converting it to the stable orthosilicate, and that the magnesia remains as periclase. Borates or compounds containing boric acid may also be used for this stabilization, but we prefer to use phosphates because they are much cheaper and much more effective. It is preferable to use dilute phosphoric acid for tempering the mass prior to burning in order to obtain the maximum distribution of the stabilizing agent.

Since materials other than phosphates and borates can act as stabilizers to prevent the reversion of the alpha calcium orthosilicate to the beta form, I do not wish to be limited specifically to the use of these compounds. Hence the stabilization of the calcium orthosilicate by the conversion of a small but predetermined amount of the lime to a stable compound with exceedingly strong habits of crystallization, which compound controls the crystalline habits of the calcium orthosilicate, is a further object of this invention.

The invention is put into practice as follows:

1. The mixture of raw materials containing sufficient phosphate bearing material to yield one-half of one percent of $P_2O_5$ in the finished product is ground and preferably formed into briquettes or adobes, and then heat treated to stabilization, without fusion of the mass, in a suitable kiln to a dense structure. Stabilization as used in this description means that the mass has been heated to or above the critical temperature at which the conversions take place, but below the fusion point of the mass so that the mass is in chemical and physical equilibrium and so that there will be no further changes below the melting point.

2. The stabilized clinker obtained in (1) is ground to suitable specifications as to particle size or proportion of particle sizes for the making of refractory products such as bricks, cements or plastics and thereafter may be used in the manufacture of such refractory products, or may be sold as such. If the clinker is pressed into refractory shapes, these shapes may be burned in the usual manner either in a periodic or in a tunnel kiln or may be used as unburned brick. In the making of such shapes, a small addition of the raw mix, or a small addition of finely ground dead burned magnesia may be made to the prepared material.

Eleven samples of the practice are given. In Examples 1 to 5 inclusive I show the correction of a dolomitic stone by the stabilization of the lime as calcium aluminate and calcium orthosilicate, using as correctives, diaspore, corundum, bauxite, kaolin and kyanite, respectively. In Examples 6 to 11 inclusive I show not only the correction of the dolomitic stone by the stabilization of lime as calcium aluminate and calcium orthosilicate, but I have, by varying the proportions of the corrective materials used, progressively increased the percentage of calcium aluminate and progressively decreased the percentage of calcium orthosilicate and in this way I have controlled the properties of the finished products.

In all the examples the mixtures contained sufficient phosphate bearing material to yield one-half of one percent of $P_2O_5$ in the finished product.

*Chemical analyses of raw materials for Mixtures 1 to 5*

|  | CaO | MgO | $SiO_2$ | $Al_2O_3$ | Loss on ignition |
|---|---|---|---|---|---|
|  | Per cent | Per cent | Per cent | Per cent | Per cent |
| Dolomite | 29.34 | 22.16 | 1.29 |  | 47.12 |
| Diaspore |  |  | 9.30 | 73.73 | 14.00 |
| Corundum |  |  | 3.79 | 92.05 |  |
| Bauxite |  |  | 8.36 | 57.26 | 26.43 |
| Kaolin |  |  | 45.39 | 39.19 | 14.01 |
| Kyanite |  |  | 31.06 | 64.25 |  |

*Mixtures*

| | Examples | | | | |
|---|---|---|---|---|---|
| | 1 | 2 | 3 | 4 | 5 |
| | Pounds | Pounds | Pounds | Pounds | Pounds |
| Dolomite | 100.0 | 100.0 | 100.0 | 100.0 | 100.0 |
| Diaspore | 46.5 | | | | |
| Corundum | | 46.7 | | | |
| Bauxite | | | 57.16 | | |
| Kaolin | | | | 25.3 | |
| Kyanite | | | | | 28.9 |

*Chemical analysis—Burned products*

| | Per cent | Per cent | Per cent | Per cent | Per cent |
|---|---|---|---|---|---|
| CaO | 31.73 | 29.50 | 30.90 | 39.35 | 35.30 |
| $Al_2O_3$ | 36.92 | 43.18 | 34.47 | 13.29 | 22.33 |
| $SiO_2$ | 6.04 | 3.08 | 6.39 | 17.18 | 12.38 |
| MgO | 23.93 | 22.23 | 23.32 | 29.70 | 26.67 |

*Mineral analyses—Burned products*

| | | | | | |
|---|---|---|---|---|---|
| Calcium aluminate | 57.19 | 66.88 | 53.40 | 21.08 | 34.59 |
| Calcium orthosilicate | 17.30 | 8.88 | 18.35 | 48.74 | 35.42 |
| Periclase | 23.93 | 22.23 | 23.32 | 29.70 | 26.67 |

*Chemical analyses of raw materials for Mixtures 6 to 11*

| | CaO | MgO | $SiO_2$ | $Al_2O_3$ | $CO_2$ |
|---|---|---|---|---|---|
| | Per cent | Per cent | Per cent | Per cent | Per cent |
| Dolomite | 29.34 | 22.16 | 1.29 | | 47.12 |
| Kaolin | | | 3.97 | 95.30 | |
| Tripoli | None | 0.28 | 96.84 | 2.64 | |

*Mixtures*

| | Examples | | | | | |
|---|---|---|---|---|---|---|
| | 6 | 7 | 8 | 9 | 10 | 11 |
| | Per cent | Per cent | Per cent | Per cent | Per cent | Per cent |
| Dolomite | 85.97 | 84.92 | 83.90 | 82.90 | 81.93 | 80.97 |
| Kaolin | 2.97 | 5.77 | 8.55 | 11.27 | 13.92 | 16.51 |
| Tripoli | 11.11 | 9.31 | 7.55 | 5.83 | 4.15 | 2.52 |

*Chemical analyses—Burned products*

| | Per cent | Per cent | Per cent | Per cent | Per cent | Per cent |
|---|---|---|---|---|---|---|
| CaO | 42.82 | 42.27 | 41.75 | 41.22 | 40.72 | 40.22 |
| $Al_2O_3$ | 2.45 | 4.25 | 6.02 | 7.74 | 9.43 | 11.09 |
| $SiO_2$ | 22.34 | 21.51 | 20.67 | 19.87 | 19.07 | 18.30 |
| MgO | 32.39 | 31.97 | 31.56 | 31.17 | 30.78 | 30.39 |

*Mineral analyses—Burned products*

| | | | | | | |
|---|---|---|---|---|---|---|
| Calcium aluminate | 3.80 | 6.59 | 9.33 | 12.00 | 14.62 | 17.19 |
| Calcium orthosilicate | 64.05 | 61.67 | 59.26 | 56.96 | 54.67 | 52.46 |
| Periclase | 32.39 | 31.97 | 31.56 | 31.17 | 30.78 | 30.39 |

This invention therefore describes the making of a refractory of periclase and calcium orthosilicate containing minor amounts of calcium aluminate and optionally monticellite, the latter two minor constituents serving as a bond for the refractory constituents. In only three of the eleven examples given hereinbefore are the amounts of di-calcium silicate less than the amounts of periclase. In the normal correction of a dolomitic starting material the di-calcium silicate will comprise 50% to 60% of the final body. If the calcium orthosilicate is not to be a major constituent, the selection of starting materials should be such as to yield excessive amounts of calcium aluminate, as in Examples 1, 2 and 3 hereof. Because of the amount of low-melting material present in the products formed in accordance with Examples 1 to 5, they have very limited application in the refractory field. But it should be borne in mind that when the amount of calcium aluminate is in excess of approximately 25%, the refractoriness of the product is lowered. The limits for the percentage of calcium aluminate can be given if a firing temperature of 3100° F. is to be maintained, as 20% if the magnesia is less than 35%, and as 25% if the magnesia is 35% or higher.

This invention teaches making use of chemical reaction to produce simultaneously one high melting-point primary refractory component while producing one or more secondary or bonding components, melting the bonding components while maintaining the primary components in a solid state whereby a predetermined placement of the resulting components is realized. Its concept is that of maintaining the relative position of the primary solid crystalline and granular components while flowing around them bonding components formed in situ. This gives an equilibrium, both chemical and physical, that has been unknown hitherto.

This invention shows how to make a refractory comprising these components with no harmful residue wherein (1) there is a particular sequence of their formation; (2) the refractory components are maintained solid and granular while the secondary components are made liquid and permitted to migrate while the solid-phase components are not; whereby a new and novel refractory is produced that is in physical and chemical equilibrium—such as has never been available before to industry by forming a clinker made of periclase, stabilized calcium orthosilicate and calcium aluminate formed in situ; grinding the clinker; shaping the ground material; and then firing the shape; with the result that a periclase-calcium orthosilicate refractory is attained whose grains are cemented with calcium aluminate wherein the refractory product has no local concentrations of low melting point components.

This patent has matured from a patent application that is a continuation-in-part of a parent patent application Serial No. 125,118, filed February 10, 1937.

Having thus described my invention, and having given examples, to which examples the inventor is by no means limited, I claim:

1. The process of making refractory material of periclase and calcium orthosilicate bonded with calcium aluminate, which comprises using a lime-magnesia starting material such as dolomite, mixing therewith starting materials that yield both alumina and silica in calculated amounts, raising the temperature of the mix to approximately 3100° F., that is, a point below the fusion point of the mass but above that at which chemical equilibrium is reached between the reactant constituents, by which calcium aluminate is formed first and thereafter stabilized calcium orthosilicate whereby there is yielded a reaction product containing neither free lime nor free silica but including periclase and calcium orthosilicate as the refractory and major components of which calcium orthosilicate forms substantially not less than 50% by weight of the refractory material with a bonding and minor component of calcium aluminate as the major portion of the bonding component; the amount of alunina added being such as to yield not less than substantially 5% of $Al_2O_3$ in the finished product and to leave the lime of the starting material in molecular excess, and the amount of silica added being such as to provide the molecular percentage of the residual lime remaining after formation of the calcium aluminate in twice the molecular percentage of the silica in the mix.

2. The process of making refractory material of periclase and calcium orthosilicate bonded with calcium aluminate and monticellite which comprises using a lime-magnesia starting material such as dolomite, mixing therewith starting materials that yield both alumina and silica in calculated amounts, raising the temperature of the mix to approximately 3100° F., that is a point below the fusion point of the mass but above that at which chemical equilibrium is reached between the reactant constituents by which calcium aluminate is formed first and thereafter stabilized calcium orthosilicate whereby there is yielded a reaction product containing neither free lime nor free silica but including periclase and calcium orthosilicate as the refractory and major components of which calcium orthosilicate forms substantially not less than 50% by weight of the refractory material, and calcium aluminate and monticellite as bonding components; the amount of alumina added being such as to yield not less than substantially 5% of $Al_2O_3$ in the finished product and to leave the lime of the starting material in molecular excess, and the amount of silica added being such as to provide the molecular percentage of the residual lime remaining after formation of the calcium aluminate to be between once and twice the molecular percentage of the silica in the mix.

GILBERT E. SEIL.